(12) United States Patent
Hironaka

(10) Patent No.: US 7,874,205 B2
(45) Date of Patent: Jan. 25, 2011

(54) MOUNTING STRUCTURE OF ELECTRONIC DEVICE, AND PNEUMATIC TIRE ONTO WHICH ELECTRONIC DEVICE IS MOUNTED BY SUCH MOUNTING STRUCTURE

(75) Inventor: Takayoshi Hironaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 189 days.

(21) Appl. No.: 12/160,045

(22) PCT Filed: Dec. 25, 2006

(86) PCT No.: PCT/JP2006/325759

§ 371 (c)(1),
(2), (4) Date: Sep. 3, 2008

(87) PCT Pub. No.: WO2007/077785

PCT Pub. Date: Jul. 12, 2007

(65) Prior Publication Data

US 2009/0266153 A1 Oct. 29, 2009

(30) Foreign Application Priority Data

Jan. 6, 2006 (JP) ............................. 2006-001728

(51) Int. Cl.
*G01M 17/02* (2006.01)
(52) U.S. Cl. ........................................................ 73/146
(58) Field of Classification Search ................ None
See application file for complete search history.

(56) References Cited

U.S. PATENT DOCUMENTS

| | | | |
|---|---|---|---|
| 6,030,478 A | 2/2000 | Koch et al. | |
| 6,208,244 B1* | 3/2001 | Wilson et al. | 340/447 |
| 6,388,567 B1* | 5/2002 | Bohm et al. | 340/442 |
| 6,653,936 B2* | 11/2003 | Bohm et al. | 340/442 |
| 7,132,930 B2* | 11/2006 | Wilson et al. | 340/426.33 |
| 7,275,427 B1* | 10/2007 | Martin | 73/146 |
| 7,592,902 B2* | 9/2009 | Wilson et al. | 340/426.33 |
| 2003/0126918 A1 | 7/2003 | Chuang et al. | |
| 2005/0126668 A1 | 6/2005 | Fornerod et al. | |
| 2005/0132787 A1 | 6/2005 | Benedict et al. | |
| 2008/0216566 A1* | 9/2008 | Vickery | 73/146.2 |

FOREIGN PATENT DOCUMENTS

JP  11-278021 A  10/1999

(Continued)

*Primary Examiner*—Andre J Allen
(74) *Attorney, Agent, or Firm*—Sughrue Mion, PLLC

(57) ABSTRACT

A bonded patch is bonded on a surface of an inner liner. A first patch wall having a first wall surface for restraining a movement of an electronic device main body in one direction is provided integrally with the bonded patch so as to project toward a tire center. A second patch wall having a second wall surface for restraining a movement of an electronic device main body in another direction is provided integrally with the bonded patch so as to project toward the tire center. A connecting segment is provided between the first patch wall and the second patch wall with bridging them for engaging a top of the electronic device main body. A crack occurrence on the mounting structure is prevented by deconcentrating a force applied on an electronic device to overall of the mounting structure to restrain an intensive stress concentration on the mounting structure.

12 Claims, 6 Drawing Sheets

FOREIGN PATENT DOCUMENTS

| | | | |
|---|---|---|---|
| JP | 2002-502765 A | 1/2002 | |
| JP | 2002-524326 A | 8/2002 | |
| JP | 2003-205716 A | 7/2003 | |
| JP | 2004-262273 A | 9/2004 | |
| JP | 2004-299535 A | 10/2004 | |
| JP | 2005-178753 A | 7/2005 | |
| JP | 2005-178761 A | 7/2005 | |
| WO | 99/41093 A1 | 8/1999 | |
| WO | 00/07834 A2 | 2/2000 | |
| WO | 2004/048132 A1 | 6/2004 | |
| WO | 2004/108439 A1 | 12/2004 | |

* cited by examiner (a)

(b)

MOUNTING STRUCTURE OF ELECTRONIC DEVICE, AND PNEUMATIC TIRE ONTO WHICH ELECTRONIC DEVICE IS MOUNTED BY SUCH MOUNTING STRUCTURE

TECHNICAL FIELD

The present inventions relate to a pneumatic tire and a mounting structure for mounting an electronic device (a transponder, an inner pressure monitoring device or the like) on an inner liner of the pneumatic tire.

BACKGROUND ART

A Patent Document 1 shows a prior art of an attaching structure for attaching an electronic device such as a transponder on an inner liner of a pneumatic tire. A specific structure according to this prior art of an attaching structure will be explained hereinbelow.

Specifically, a bonded patch is bonded onto a surface of an inner liner. The bonded patch is made of rubber. In addition, a patch strap is integrally formed with the bonded patch. The patch strap is made of rubber. Further, the patch strap can be inserted into a through hole formed in an electronic device main body. An engaged hole is formed on an end of the patch strap, which can be engaged with an engaging pin provided on the electronic device main body.

Therefore, the patch strap is inserted into the through hole of the electronic device main body. Then, the engaged hole of the patch strap is engaged with the engaging pin. According to this configuration, the electronic device can be attached on the inner liner with being dangled on the patch strap.

Patent Document 1: PCT International Application Laid-Open No. WO2004/108439

DISCLOSURE OF THE INVENTION

However, since the electronic device can be attached on the inner liner with being dangled on the patch strap as described above, a stress is concentrated on a base end of the patch strap intensively due to a force applied on the electronic device under a pneumatic tire running. As a result, a crack may tend to occur on the base end of the patch strap and a fracture may tend to occur from the crack. Therefore, it is hard to improve durability of the above-described attaching structure.

Then, an object of the present invention is, in order to solve the above-mentioned issues, to provide a novel mounting structure that can restrain an intensive stress concentration by deconcentrating a force applied on the electronic device under a pneumatic tire running, and to provide a pneumatic tire with the novel mounting structure.

The present invention is a mounting structure for mounting an electronic device on an inner liner of a pneumatic tire. The mounting structure according to the present invention includes a bonded patch, a first patch wall, a second patch wall and a connecting segment. The above elements are made of rubber. The bonded patch is bonded on a surface (incl. circumferential surface) of the inner liner. The first patch wall is provided integrally with the bonded patch so as to project toward a tire center and has a first wall surface for restraining a movement of an electronic device main body in one direction. The second patch wall is provided integrally with the bonded patch so as to project toward the tire center with being opposed to the first patch wall and has a second wall surface for restraining a movement of the electronic device main body in another direction. The connecting segment is provided integrally with the first patch wall and the second patch wall with being bridge therebetween and can engage a top of the electronic device main body.

Note that, in respect to "the electronic device is mounted on the inner liner", it is not bounden that the electronic device directly contacts with the inner liner.

According to the present invention, the electronic device main body is inserted between the first wall surface of the first patch wall and the second wall surface of the second patch wall, and the top of the electronic device main body is engaged with the connecting segment. As a result, the electronic device is mounted on the inner liner under a state where the movement of the electronic device in both directions (the one direction and the other direction) is restrained by the first patch wall and the second patch wall integrated via the connecting segment. Therefore, a force applied on the electronic device under a pneumatic tire running is deconcentrated to overall of the mounting structure, so that an intensive stress concentration on the mounting structure is restrained.

Here, it is preferable that an engaged hole for being engaged with a pin provided on the electronic device main body is formed in the connecting segment.

According to this configuration, in addition to an engagement of the top of the electronic device body by the connecting segment, the movement of the electronic device is restrained by an engagement of the engaged hole of the connecting segment with the engaging pin, so that the mounting of the electronic device can be made stable.

Here, it is preferable that a range from the first patch wall to the second patch wall via the connecting segment is reinforced by reinforcing fiber.

According to this configuration, stiffness of the first patch wall, the second patch wall and the connecting segment is enhanced and also the force applied on the electronic device under the pneumatic tire running can be easily deconcentrated to overall of the mounting structure.

Here, it is preferable that the bonded patch is vulcanization-bonded on the inner liner by vulcanizing a raw tire after the bonded patch has been attached on the inner liner of the raw tire with the connecting segment being made slack.

Note that the raw tire is a not-yet-vulcanized tire which has not yet completed as the pneumatic tire.

According to this configuration, even if the connecting segment is deformed toward the inner liner due to pressing by a bladder during the vulcanization of the raw tire, reduced is a stress nearby bonded plane (back surface) due to a deformation of the connecting segment. As a result, the bonded patch can be bonded on the inner liner firmly.

In addition, the present invention is a mounting structure for mounting an electronic device on an inner liner of a pneumatic tire. The mounting structure according to the present invention includes a bonded patch, a first patch wall, a first patch pawl, a second patch wall and a second patch pawl. The above elements are made of rubber. The bonded patch is bonded on a surface (incl. circumferential surface) of the inner liner. The first patch wall is provided integrally with the bonded patch so as to project toward a tire center and has a first wall surface for restraining a movement of an electronic device main body in one direction. The first patch pawl is provided integrally with the first patch wall and can engage a top of the electronic device main body from one side. The second patch wall is provided integrally with the bonded patch so as to project toward the tire center with being opposed to the first patch wall and has a second wall surface for restraining a movement of the electronic device main body in another direction. The second patch pawl is provided integrally with the second patch wall and can engage the top of the electronic device main body from another side.

Note that, in respect to "the electronic device is mounted on the inner liner", it is not bounden that the electronic device directly contacts with the inner liner.

According to this configuration, the electronic device main body is inserted between the first wall surface of the first patch wall and the second wall surface of the second patch wall, and the top of the electronic device main body is engaged by the first patch pawl from the one side and also the top of the electronic device main body is engaged by the second patch pawl from the other side. As a result, the electronic device is mounted on the inner liner under a state where the movement of the electronic device in both directions (the one direction and the other direction) is restrained by the first patch wall and the second patch wall. Therefore, a force applied on the electronic device under a pneumatic tire running is deconcentrated to overall of the mounting structure, so that an intensive stress concentration on the mounting structure is restrained.

Here, it is preferable that the first wall surface and the second wall surface extend in a tire width direction, respectively.

According to this configuration, restrained can be rattling of the electronic device under expansion and contraction of the inner liner in a tire circumferential direction under the pneumatic tire running, so that that the mounting of the electronic device can be made stable.

Here, it is preferable that the bonded patch is composed of a first bonded patch bonded on the surface of the inner liner and a second bonded patch bonded on the surface of the inner liner and opposed to the first bonded patch. Here, the first patch wall is provided integrally with the first bonded-patch so as to project toward the tire center, and the second patch wall is provided integrally with the second bonded patch so as to project toward the tire center.

According to this configuration, the mounting structure is made more light-weighted than in a case where they were made as one unified bonded patch. Concurrently, enhanced can be following-capability of the bonded patches to expansion and contraction of the inner liner in the tire circumferential direction under the pneumatic tire running.

Here, it is preferable that each height of the first patch wall and the second patch wall is within ×0.3 to ×1.5 of a height of the transponder main body.

If each height of the first patch wall and the second patch wall is lower than ×0.3 of the height of the electronic device main body, a movement of the electronic device main body cannot be restrained sufficiently by the first patch wall and the second patch wall. On the other hand, if each height of the first patch wall and the second patch wall is higher than ×1.5 of the height of the electronic device main body, an over-tuning moment applied nearby bonded plane (back surface) of the bonded patch increases under the pneumatic tire running due to high gravity-centers of the first patch wall and the second patch wall.

Here, it is preferable that thickness of the bonded patch is equal-to or smaller-than ×0.4 of a height of the transponder main body.

If the thickness is larger than ×0.4 of the height of the electronic device main body, the over-tuning moment applied nearby the bonded plane of the bonded patch increases under the pneumatic tire running due to a high gravity-center of the electronic device.

Here, it is preferable that angle between the surface of the inner liner and an edge of the bonded is equal-to or smaller-than thirty degrees.

If the angle of the edge of the bonded patch is set to larger than thirty degrees, it becomes impossible to enhance following-capability of the edge to expansion and contraction of the inner liner in the tire circumferential direction under the pneumatic tire running.

Here, it is preferable that the bonded patch is formed so as to be gradually made thinner towards an edge thereof.

According to this configuration, enhanced can be the following-capability of the edge to expansion and contraction of the inner liner in the tire circumferential direction under the pneumatic tire running.

In addition, a pneumatic tire of the present invention includes the above-described mounting structure.

BRIEF DESCRIPTION OF THE DRAWINGS

FIG. 1(*b*) is an overhead view of FIG. 1(*a*).

FIG. 2(*b*) is an overhead view of FIG. 2(*a*).

FIG. 5(*b*) is an overhead view of FIG. 5(*a*).

FIG. 6(*b*) is an overhead view of FIG. 6(*a*).

BEST MODE(S) FOR CARRYING OUT THE INVENTION

A first embodiment according to the present invention will be explained with reference to FIGS. 1 to 3.

Figure 3:
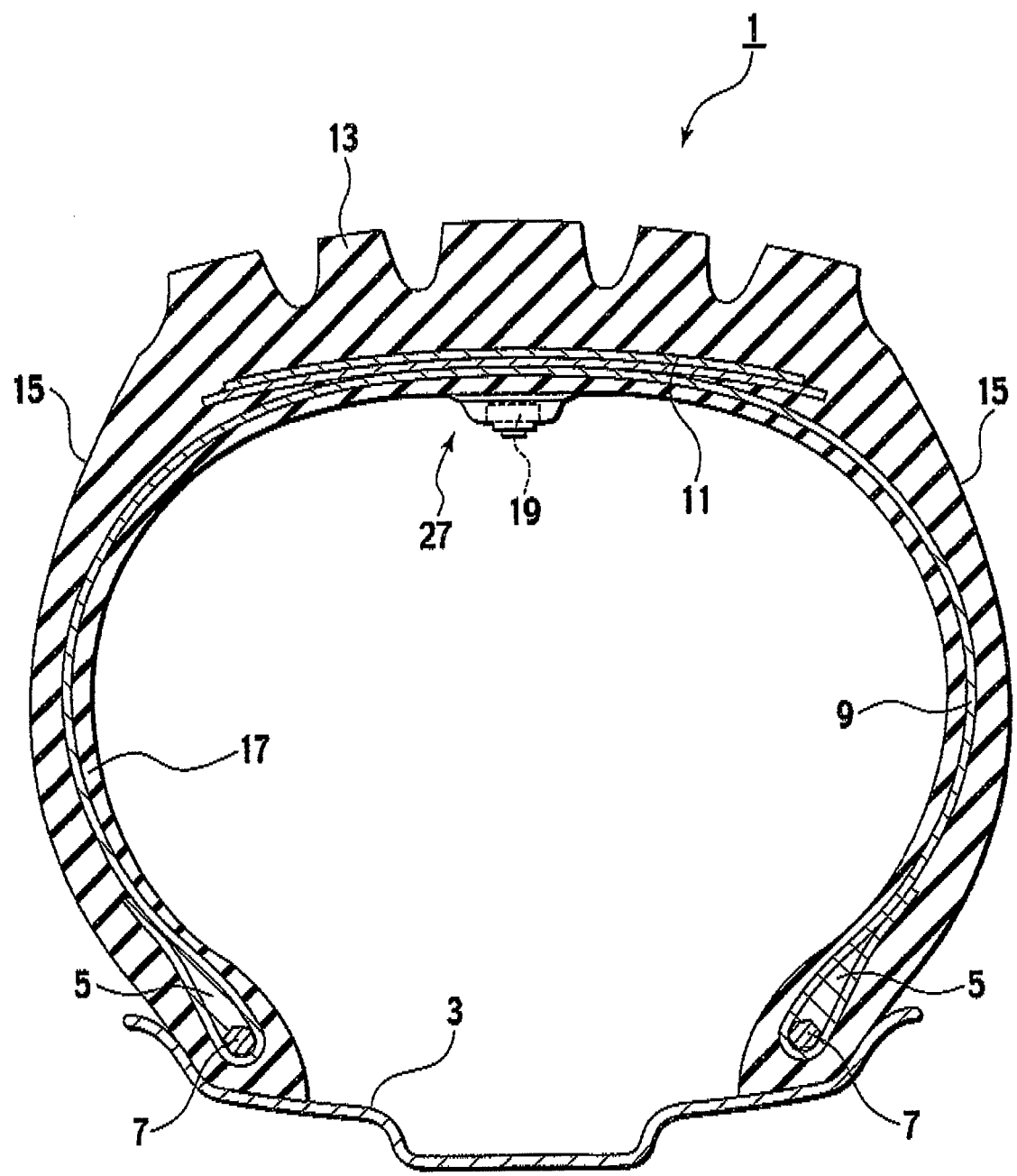
FIG. 3 is a partial cross-sectional view showing a pneumatic tire of an embodiment according to the present invention.

As shown in FIG. 3, a pneumatic tire 1 in the first embodiment can be filled with air as working gas and has a pair of annular bead fillers 5 capable of being tightly seated on a rim 3. A bead core 7 is mounted within each of the bead fillers 5. In addition, a carcass 9 is integrally provided between the pair of bead fillers 5 as a structural member. This carcass 9 has a troidal cross-sectional shape. Further, a multiply belt 11 is integrated on an outer circumferential surface of the carcass 9.

A tread 13 capable of being contacted with a road surface is integrally provided on the outer circumferential surface of the carcass 9 so as to and surround the belt 11. Sidewalls 15 for protecting the carcass 9 are integrally provided on outer side surfaces of the carcass 9. In addition, an inner liner 17 for preventing air permeation is also integrally provided on an inner surface (incl. an inner circumferential surface).

Figure 1:
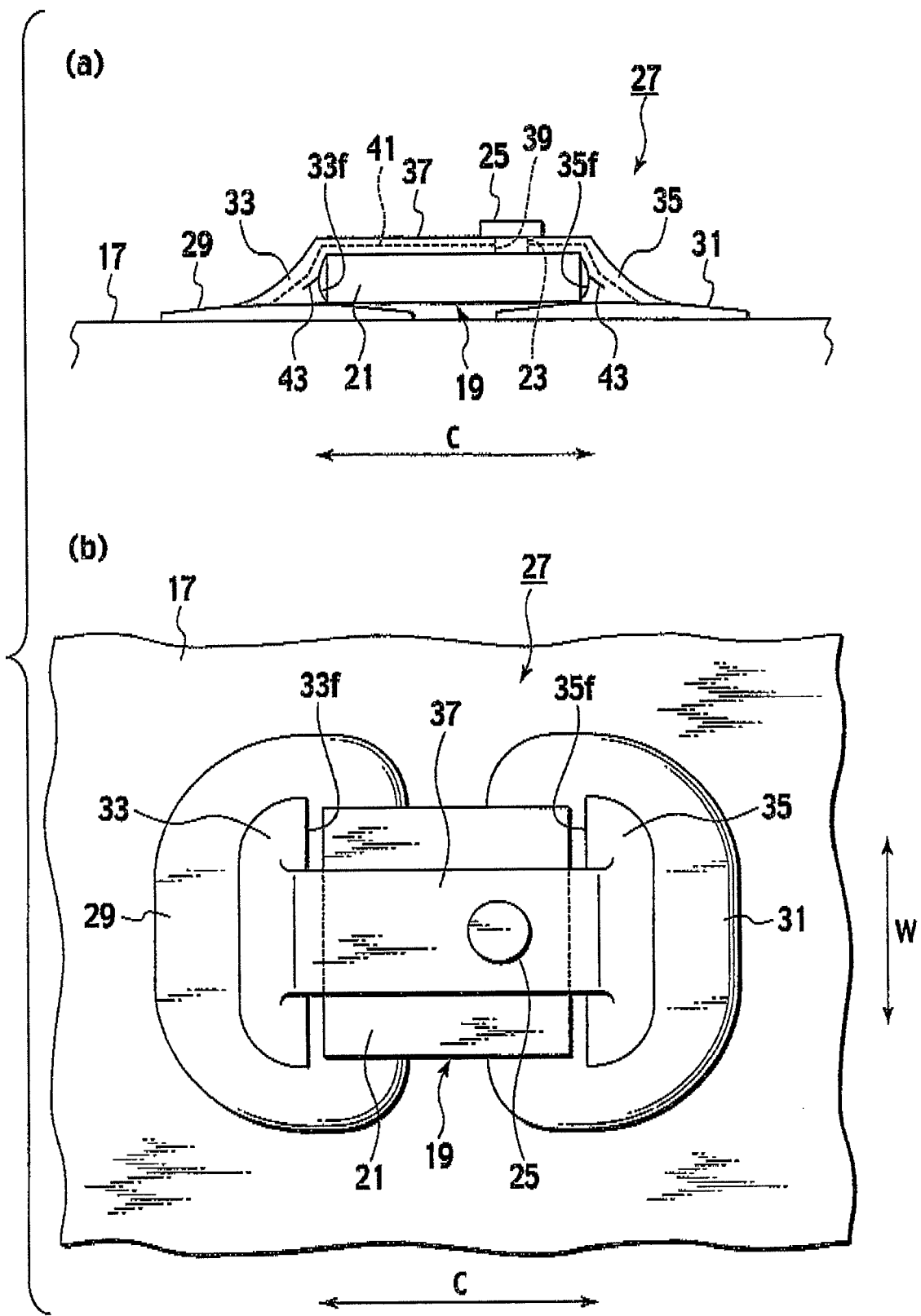
FIG. 1(*a*) is a diagram showing a patch mounting structure with a transponder being mounted according to a first embodiment.

As shown in FIGS. 1(*a*) and 1(*b*), a transponder 19 is mounted on an inner circumferential surface of the inner liner 17. This transponder 19 is one of electronic devices and equipped to monitor an inner pressure and inner temperature of the tire. In addition, the transponder 19 includes a box-shaped transponder main body (electronic device main body) 21. The transponder main body 21 is resign-molded and incorporates various electronic components (not shown). A pin 23 is provided on top of the transponder main body 21. A circular flange 25, which has a larger outer diameter than that of the pin 23, is formed on top of the pin 23.

Next, a mounting structure 27 for mounting the transponder 19 on a circumferential surface of the inner liner 17 will be explained.

As shown in FIGS. 1(*a*), 1(*b*), 2(*a*) and 2(*b*), a first bonded patch 29 is bonded on the circumferential surface of the inner liner 17. The first bonded patch 29 is made of rubber. In addition, a second bonded patch 31 is also bonded on the circumferential surface of the inner liner 17 with being slightly distanced from and opposed to the first bonded patch 29. The second bonded patch 31 is also made of rubber.

Figure 2:
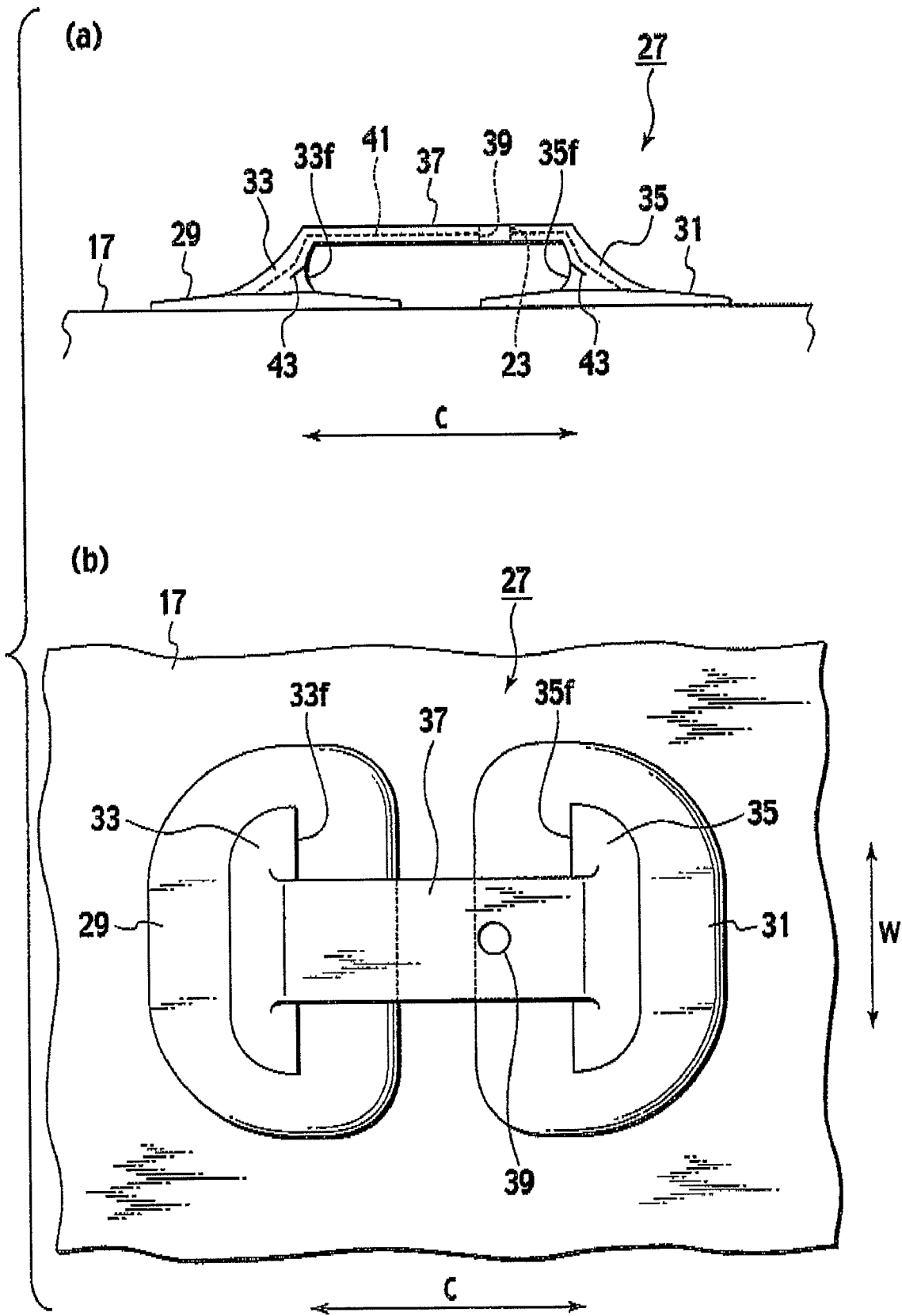
FIG. 2(*a*) is a diagram showing the patch mounting structure before the transponder being mounted according to the first embodiment.

A first patch wall 33 is integrally formed on the first bonded patch 29 so as to project toward a tire center (upward in FIG. 1(*a*) and FIG. 2(*a*)). The first patch wall 33 is also made of rubber. In addition, the first patch wall 33 has a first wall surface 33*f* which prevents a movement of the transponder 19 in one direction (leftward in FIG. 1(*a*), FIG. 1(*b*), FIG. 2(*a*) and FIG. 2(*b*)). The first patch wall 33*f* extends almost parallel to a tire width direction W.

A second patch wall 35 opposing the first patch wall 33 is integrally formed on the second bonded patch 33 so as to project toward the tire center. The second patch wall 35 is also made of rubber. In addition, the second patch wall 35 has a second wall surface 35*f* which prevents a movement of the transponder 19 in another direction (rightward in FIG. 1(*a*), FIG. 1(*b*), FIG. 2(*a*) and FIG. 2(*b*)). The second patch wall 35*f* also extends almost parallel to the tire width direction W.

A connecting segment 37, on which the top of the transponder 19 can be engaged, is integrally formed between the first patch wall 33 and the second patch wall 35 with bridging them. The connecting segment 37 is also made of rubber. In addition, an engaged hole 39 capable of being engaged with the pin 23 is formed in the connecting segment 37.

Figure 4:
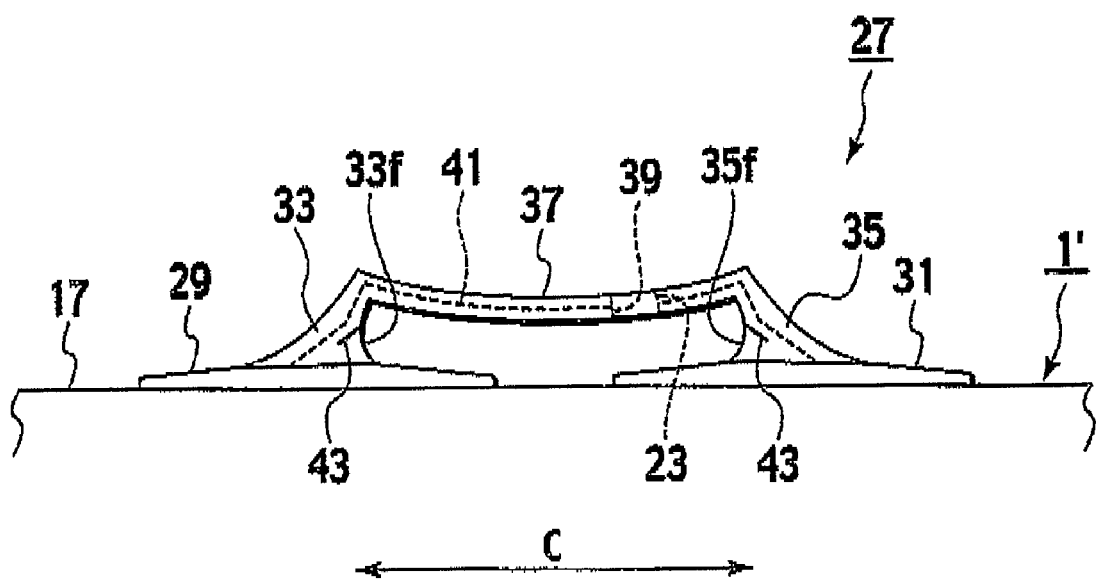
FIG. 4 is a diagram showing a state where a first bonded patch and a second bonded patch are bonded onto a surface of an inner line of a raw tire.

Then, a range from the first patch wall 33 to the second patch wall 35 via the connecting segment 37 is reinforced by reinforcing fiber 41. In addition, notches 43 are formed on the first patch wall 33 nearby one end of the connecting segment 37 and on the second patch wall 35 nearby another end of the connecting segment 37, respectively. In the present embodiment, as shown in FIG. 4, the first bonded patch 29 and the second bonded patch 31 are attached onto the surface of the inner liner 17 of a raw tire 1' with the connecting segment 37 being made slack. Subsequently, the first bonded patch 29 and the second bonded patch 31 are vulcanization-bonded on the circumferential surface of the inner liner 17. Note that the raw tire 1' is a not-yet-vulcanized tire which has not yet completed as the pneumatic tire 1.

An actual configuration of the mounting structure 27 will be described as follows.

Each height of the first patch wall 33 and the second patch wall 35 is set within ×0.3 to ×1.5 of the height of the transponder main body 21. If each height of the first patch wall 33 and the second patch wall 35 is lower than ×0.3 of the height of the transponder main body 21, a movement of the transponder main body 21 cannot be restrained sufficiently by the first patch wall 33 and the second patch wall 35. On the other hand, if each height of the first patch wall 33 and the second patch wall 35 is higher than ×1.5 of the height of the transponder main body 21, over-tuning moments applied nearby bonded planes (back surfaces) of the first bonded patch 29 and the second bonded patch 31 increase under the pneumatic tire 1 running due to high gravity-centers of the first patch wall 33 and the second patch wall 35.

In addition, each thickness of the first bonded patch 29 and the second bonded patch 31 is set equal-to or smaller-than ×0.4 of the height of the transponder main body 21. If the thickness is larger than ×0.4 of the height of the transponder main body 21, the over-tuning moments applied nearby the bonded planes of the first bonded patch 29 and the second bonded patch 31 increase under the pneumatic tire 1 running due to a high gravity-center of the transponder 19. Furthermore, surfaces of the first bonded patch 29 and the second bonded patch 31 are formed so as to be gradually made thinner towards their outer edges, respectively.

Specifically, each angle between the surface of the inner liner 17 and the edges of the first bonded patch 29 and the second bonded patch 31 is set to equal-to or smaller-than thirty degrees. If each angle of the edges of the first bonded patch 29 and the second bonded patch 31 is set to larger than thirty degrees, it becomes impossible to enhance following-capability of the edge to expansion and contraction of the inner liner 17 in a tire circumferential direction C under the pneumatic tire 1 running.

Subsequently, workings and advantages of the first embodiment will be explained.

The transponder main body 21 is inserted between the first wall surface 33*f* and the second wall surface 35*f*, and the top of the transponder main body 21 is engaged with the connecting segment 37. Further, the flange 25 is inserted into the engaged hole 39 of the connecting segment 37, so that the engaged hole 39 of the connecting segment 37 is engaged with the pin 23. As a result, the transponder 19 is mounted on the inner liner 17 under a state where the movement of the transponder 19 in both direction (the one direction and the other direction) is restrained by the first patch wall 33 and the second patch wall 35 integrated via the connecting segment 37. Therefore, since a force applied on the transponder 19 under the pneumatic tire 1 running is deconcentrated to overall of the mounting structure 27, an intensive stress concentration on the mounting structure is restrained Especially, since reinforced is the range from the first patch wall 33 to the second patch wall 35 via the connecting segment 37 by the reinforcing fiber 41, the force applied on the transponder 19 under the pneumatic tire 1 running can be easily deconcentrated to overall of the mounting structure 27 due to a stiffness enhancement of the first patch wall 33, the second patch wall 35 and the connecting segment 37.

Since the first wall surface 33*f* and the second wall surface 35*f* extend in the tire width direction W, restrained can be rattling of the transponder 19 under the expansion and contraction of the inner liner 17 in the tire circumferential direction C under the pneumatic tire 1 running. As a result, the mounting of the transponder 19 can be made stable. In addition, the mounting of the transponder 19 can be made stable further by restraining the movement of the transponder 19 with the engagement between the engaged hole 39 of the connecting segment 37 and the pin 23.

Since each height of the first patch wall 33 and the second patch wall 35 is set within ×0.3 to ×1.5 of the height of the transponder main body 21, a movement of the transponder main body 21 can be restrained sufficiently by the first patch wall 33 and the second patch wall 35. Concurrently, reduced can be over-tuning moments applied nearby bonded planes (back surfaces) of the first bonded patch 29 and the second bonded patch 31 under the pneumatic tire 1, by making the gravity-centers of the first patch wall 33 and the second patch wall 35 lower. In addition, since each thickness of the first bonded patch 29 and the second bonded patch 31 is set equal-to or smaller-than ×0.4 of the height of the transponder main body 21, reduced can be the over-tuning moments applied nearby the bonded planes of the first bonded patch 29 and the second bonded patch 31 under the pneumatic tire 1 running, by making the gravity-center of the transponder 19 lower.

Since the first bonded patch 29 and the second bonded patch 31 are mounted with being slightly-distanced-from each other, the mounting structure is made more light-weighted than in a case where they were made as one unified bonded patch. Concurrently, enhanced can be the following-capability of the bonded patches (the first bonded patch 29 and the second bonded patch 31) to expansion and contraction of the inner liner 17 in the tire circumferential direction C under the pneumatic tire 1 running. In addition, since each angle between the surface of the inner liner 17 and the edges of the first bonded patch 29 and the second bonded patch 31 is set to equal-to or smaller-than thirty degrees, further enhanced can be the following-capability of the edges of the first bonded patch 29 and the second bonded patch 31 to the above-mentioned expansion and contraction of the inner liner 17.

As described above, the first bonded patch 29 and the second bonded patch 31 are attached on the inner liner 17 of the raw tire 1' with the connecting segment 37 being made slack before the raw tire 1' has been vulcanized. Therefore, even if the connecting segment 37 is deformed toward the inner liner 17 due to pressing by a bladder (not shown) during the vulcanization of the raw tire 1', reduced is a stress nearby the bonded planes (back surfaces) due to a deformation of the connecting segment 37 and then the first bonded patch 29 and the second bonded patch 31 can be bonded on the inner liner 17 firmly.

As described above, according to the first embodiment, a force applied to the transponder 19 under the pneumatic tire 1 running is deconcentrated to overall of the mounting structure 27 to restrain an intensive stress concentration on the mounting structure, thereby it is restrained that a crack is occurred on the mounting structure 27. As a result, durability of the mounting structure 27 can be improved without difficulty.

In addition, since the mounting of the transponder can be made stable, durability of the transponder 19 itself is improved.

Furthermore, since the mounting structure 27 can be made more light-weighted than in a case where they were made as one unified bonded patch, driveability-and-stability performance and uneven-abrasion-resistant performance can be improved by restraining weight-variation of the pneumatic tires 1.

In addition, the first bonded patch 29 and the second bonded patch 31 can be bonded on the inner liner 17 firmly and also enhanced can be the following-capability of the edges of the first bonded patch 29 and the second bonded patch 31 to the expansion and contraction of the inner liner 17 in the tire circumferential direction C. Therefore, it can be prevented sufficiently that the first bonded patch 29 and the second bonded patch 31 exfoliate under the pneumatic tire 1 running.

Figure 5:
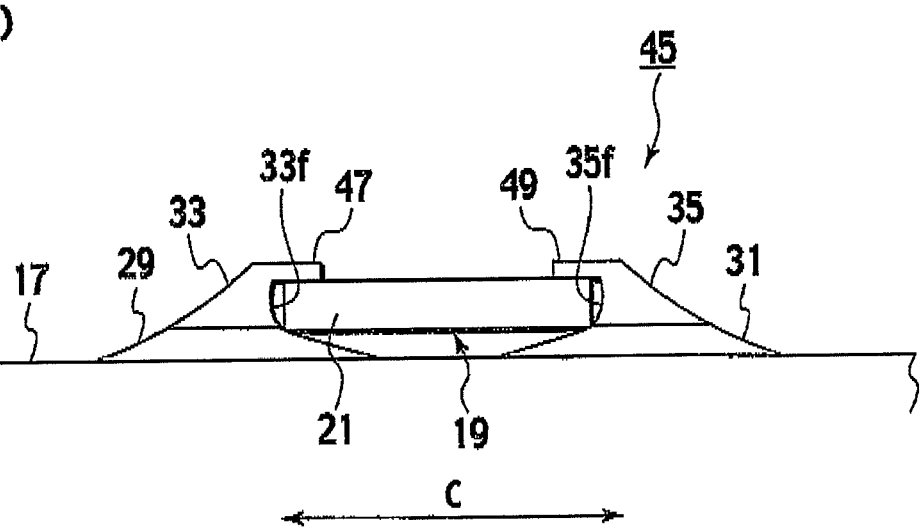
FIG. 5(*a*) is a diagram showing a patch mounting structure with a transponder being mounted according to a second embodiment.
Figure 5:
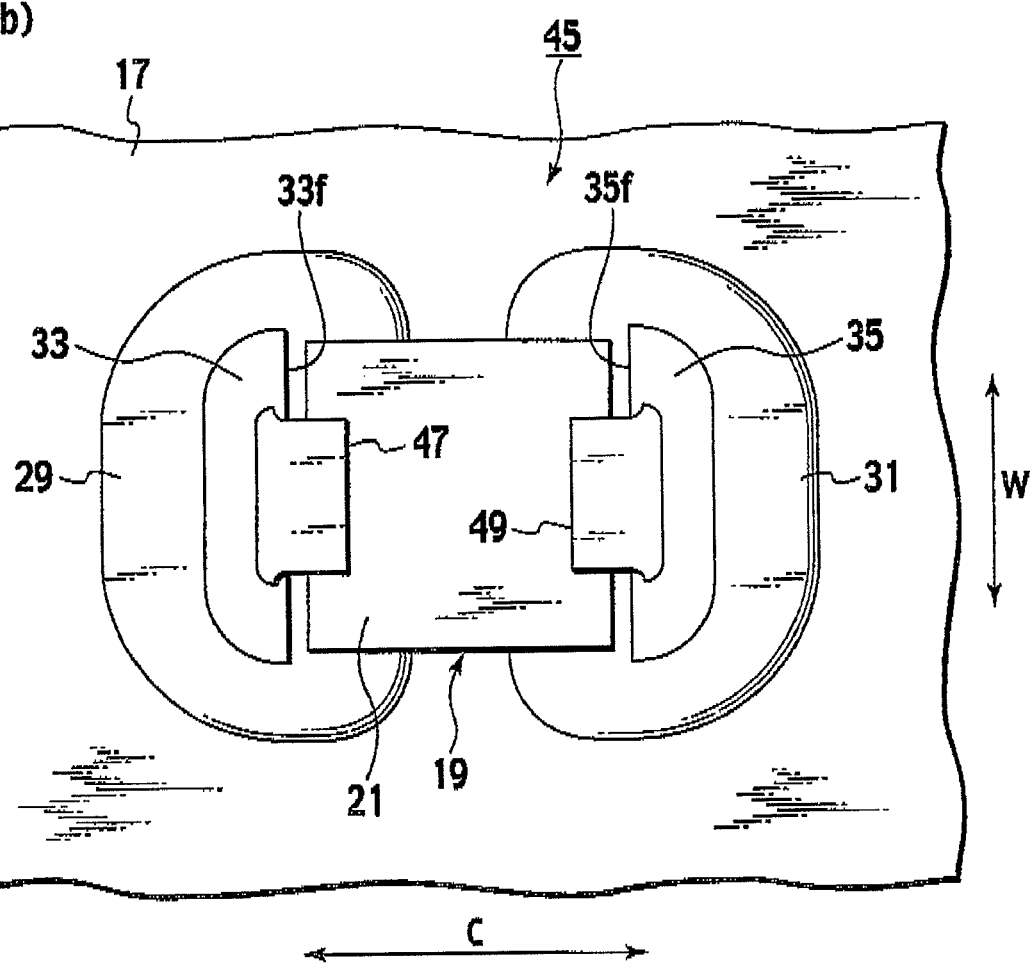
Figure 6:
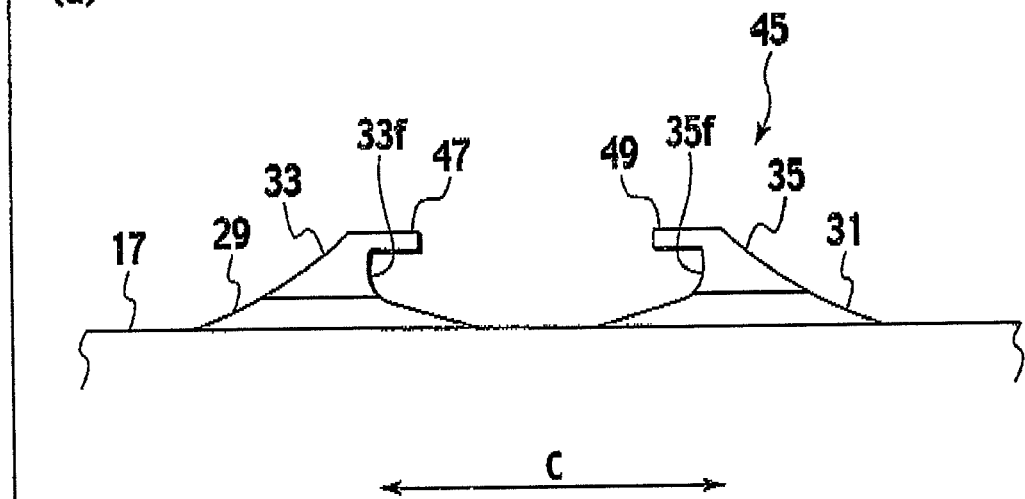
FIG. 6(*a*) is a diagram showing the patch mounting structure before the transponder being mounted according to the second embodiment.
Figure 6:
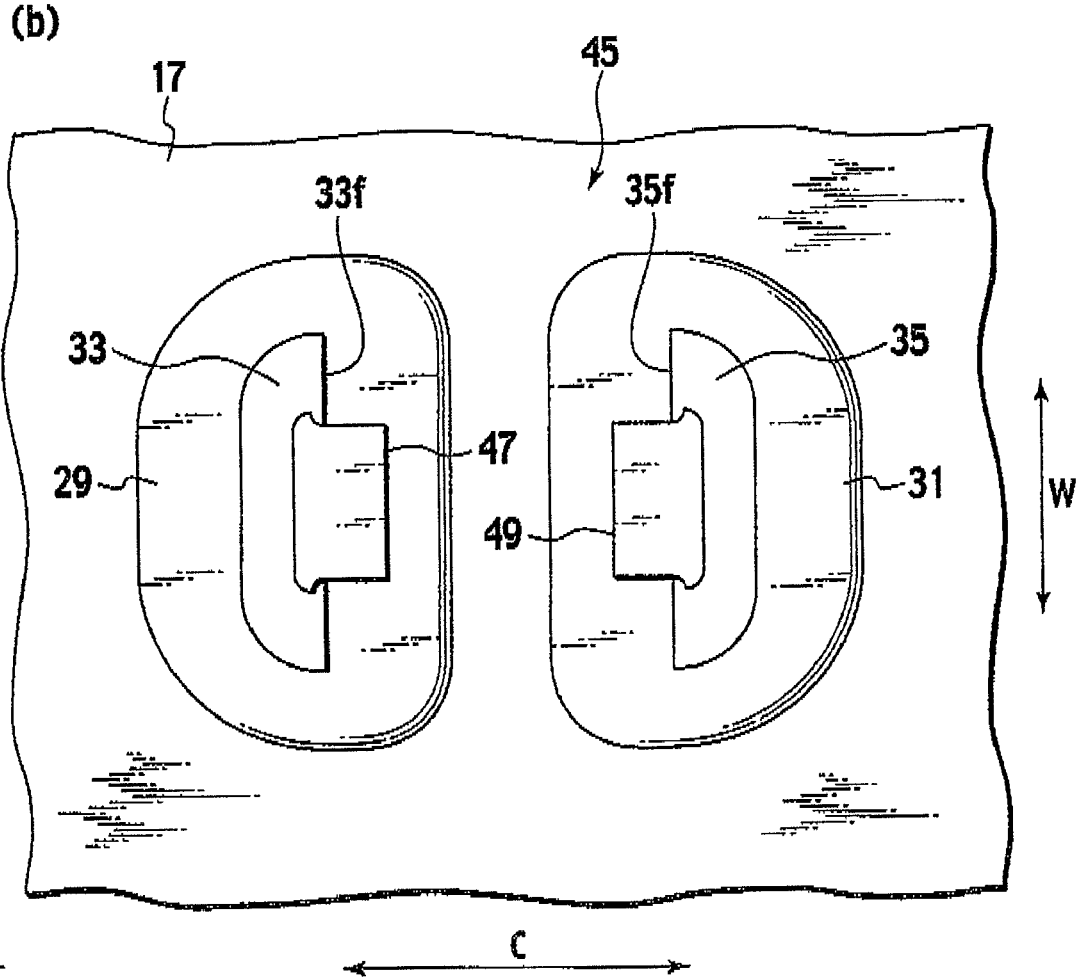

Next, a second embodiment will be explained with reference to FIGS. 5 and 6.

As shown in FIGS. 5(a), 5(b), 6(a) and 6(b), a mounting structure 45 in the second embodiment has almost the same configuration as that in the mounting structure 27 of the first embodiment. Briefly explained will be only different portions among concrete configurations in the mounting structure 45 according to the second embodiment from those in the mounting structure 27 according to the first embodiment. Note that some of elements in the mounting structure 45 according to the second embodiment, which correspond to those in then mounting structure 27 according to the first embodiment, will be allocated with identical numerals in the drawings to omit their detail description.

The mounting structure 45 according to the second embodiment includes a first patch pawl 47 and a second patch pawl 49 in place of the connecting segment 37 in the first embodiment. Specifically, the first patch pawl 47 is integrally formed on an upper end of the first bonded patch 29 to engage the top of the transponder main body 21 from one side. The first patch pawl 47 is made of rubber. In addition, the second patch pawl 49 is integrally formed on an upper end of the second bonded patch 29 to engage the top of the transponder main body 21 from another side. The second patch pawl 49 is also made of rubber. Note that, in the second embodiment, the transponder of a mounted object does not need to include the pin 23 and the flange 25 (see FIG. 1).

Then, according to the second embodiment, the same workings and advantages can be achieved as those according to the first embodiment.

Note that the present invention can be achieved in various embodiments other than the above embodiments. In addition, a scope of the right included in the present invention is not limited to these embodiments.

INDUSTRIAL APPLICABILITY

According to the present invention, since a force applied on an electronic device under a pneumatic tire running is deconcentrated to overall of a mounting structure to restrain an intensive stress concentration on the mounting structure, durability of the mounting structure can be improved without difficulty by restraining a crack occurrence on the mounting structure.

The invention claimed is:

1. A mounting structure for mounting an electronic device on an inner liner of a pneumatic tire, comprising:
    a rubber bonded patch bonded on a surface of the inner liner;
    a rubber first patch wall which is provided integrally with the bonded patch so as to project toward a tire center and has a first wall surface for restraining a movement of an electronic device main body in one direction;
    a rubber second patch wall which is provided integrally with the bonded patch so as to project toward the tire center with being opposed to the first patch wall and has a second wall surface for restraining a movement of the electronic device main body in another direction; and
    a rubber connecting segment which is provided integrally with the first patch wall and the second patch wall with being bridged therebetween and configured to engage a top of the electronic device main body.

2. The mounting structure according to claim 1, wherein an engaged hole for being engaged with a pin provided on the electronic device main body is formed in the connecting segment.

3. The mounting structure according to claim 1, wherein a range from the first patch wall to the second patch wall via the connecting segment is reinforced by reinforcing fiber.

4. The mounting structure according to claim 1, wherein the bonded patch is vulcanization-bonded on the inner liner by vulcanizing a raw tire after the bonded patch has been attached on the inner liner of the raw tire with the connecting segment being made slack.

5. A mounting structure for mounting an electronic device on an inner liner of a pneumatic tire, comprising:
    a rubber bonded patch bonded on a surface of the inner liner;
    a rubber first patch wall which is provided integrally with the bonded patch so as to project toward a tire center and has a first wall surface for restraining a movement of an electronic device main body in one direction;

a rubber first patch pawl which is provided integrally with the first patch wall and configured to engage a top of the electronic device main body from one side;

a rubber second patch wall which is provided integrally with the bonded patch so as to project toward the tire center with being opposed to the first patch wall and has a second wall surface for restraining a movement of the electronic device main body in another direction; and a rubber second patch pawl which is provided integrally with the second patch wall and configured to engage the top of the electronic device main body from another side.

6. The mounting structure according to claim 1 or 5, wherein the first wall surface and the second wall surface extend in a tire width direction, respectively.

7. The mounting structure according to claim 1 or 5, wherein the bonded patch is composed of a first bonded patch bonded on the surface of the inner liner and a second bonded patch bonded on the surface of the inner liner and opposed to the first bonded patch, the first patch wall is provided integrally with the first bonded patch so as to project toward the tire center, and the second patch wall is provided integrally with the second bonded patch so as to project toward the tire center.

8. The mounting structure according to claim 1 or 5, wherein each height of the first patch wall and the second patch 20 wall is within ×0.3 to ×1.5 of a height of the transponder main body.

9. The mounting structure according to claim 1 or 5, wherein thickness of the bonded patch is equal-to or smaller-than ×0.4 of a height of the transponder main body.

10. The mounting structure according to claim 1 or 5, wherein angle between the surface of the inner liner and an edge of the bonded is equal-to or smaller-than thirty degrees.

11. The mounting structure according to claim 1 or 5, wherein the bonded patch is formed so as to be gradually made thinner towards an edge thereof.

12. A pneumatic tire comprising the mounting structure according to claim 1 or 5.

* * * * *